Inventor
Manfred G. Wright
William R. Kearney
By Willits, Helmig and Baillio
Attorneys

Oct. 9, 1956                M. G. WRIGHT ET AL                2,765,663
                    INERTIA DRIVE SIGNAL SEEKING TUNER
Filed March 8, 1952                                    5 Sheets-Sheet 3

Inventor
Manfred G. Wright
William R. Kearney
By Willits, Helmig and Baillie
Attorneys

United States Patent Office 2,765,663
Patented Oct. 9, 1956

2,765,663

INERTIA DRIVE SIGNAL SEEKING TUNER

Manfred G. Wright and William R. Kearney, Kokomo, Ind., assignors to General Motors Corporation, Detroit, Mich., a corporation of Delaware Application March 8, 1952, Serial No. 275,646

11 Claims. (Cl. 74—10.2)

This invention relates to an electrical apparatus and more particularly to a simple device wherein a short burst of energy is stored and given out at a slowly increasing rate over a comparatively long period of time. One particular application is for operating a signal seeking tuning device for a radio.

It is an object of our invention to provide a long stroke mechanism for powering a spring driven kinetic energy device.

It is another object of our invention to provide a spring driving means having kinetic energy which will provide a slow smooth initial acceleration of the device.

It is another object of our invention to provide an improved connecting arrangement between an operating means and a spring driven device which, after transferring the energy to the spring driven device, will slowly, smoothly and automatically release the spring driven device for operation.

The invention illustrated in two embodiments each incorporating a push mechanism connected by a pair of links with a spring operated member. The pair of links are normally lightly biased against a stop to prevent their collapsing during the operation of the push mechanism so that the force upon the push mechanism may be applied to the spring operated member. The spring operated member is provided with a pawl adapted to engage teeth in driving connection with a flywheel. The pawl is spring controlled in such a way that it releases itself from the teeth near the end of the stroke of the spring operated member. A stop is arranged adjacent the push mechanism and cooperates with one of the links to collapse the links when the push mechanism is pushed a sufficient distance inwardly to release the spring operated member for operation under the force of the springs.

Further objects and advantages of the present invention will be apparent from the following description, reference being had to the accompanying drawings, wherein a preferred form of the present invention is clearly shown.

The two forms of the invention shown in the drawings are employed for operating the tuning mechanism of a stop-on-signal type of radio apparatus. Its usage, however, may extend to all fields wherein it is desired to efficiently convert a short burst of energy of comparatively high force into a slightly longer flow of energy at a lesser force.

Figure 3:
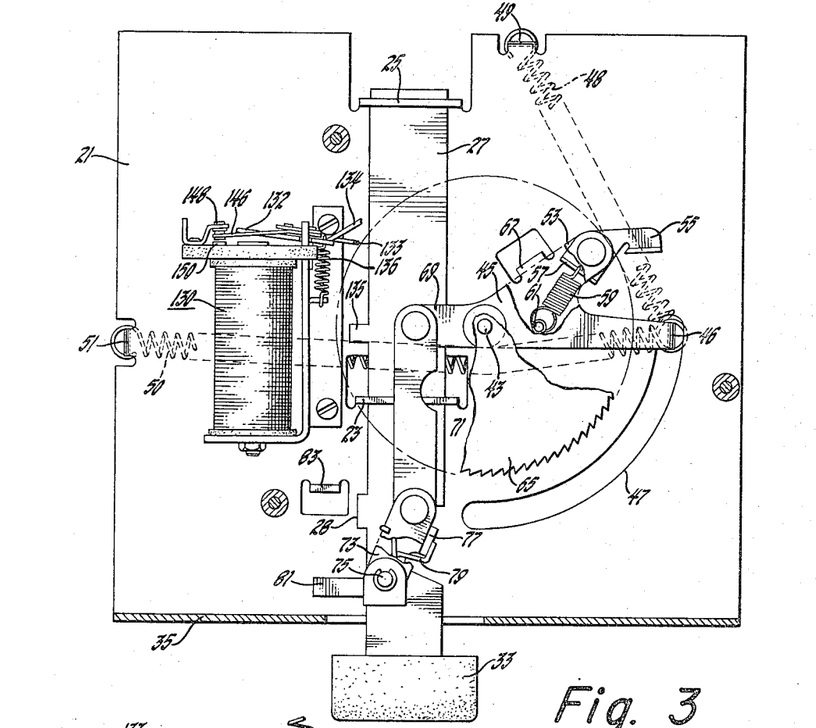
Fig. 3 is a sectional view taken along the line 3—3 of Fig. 2.

Referring now to the drawings and more particularly to Fig. 3 there is shown a bed plate 21 which supports the mechanism. The bed plate 21 is provided with the turned up slotted projections 23 and 25. The slots of the projection 23 and 25 receive the rear portion of a slide member 27. This slide member 27 is provided with a push button 33 located in front of the turned up flange 35 at the front end of the bed plate 21.

Figure 1:
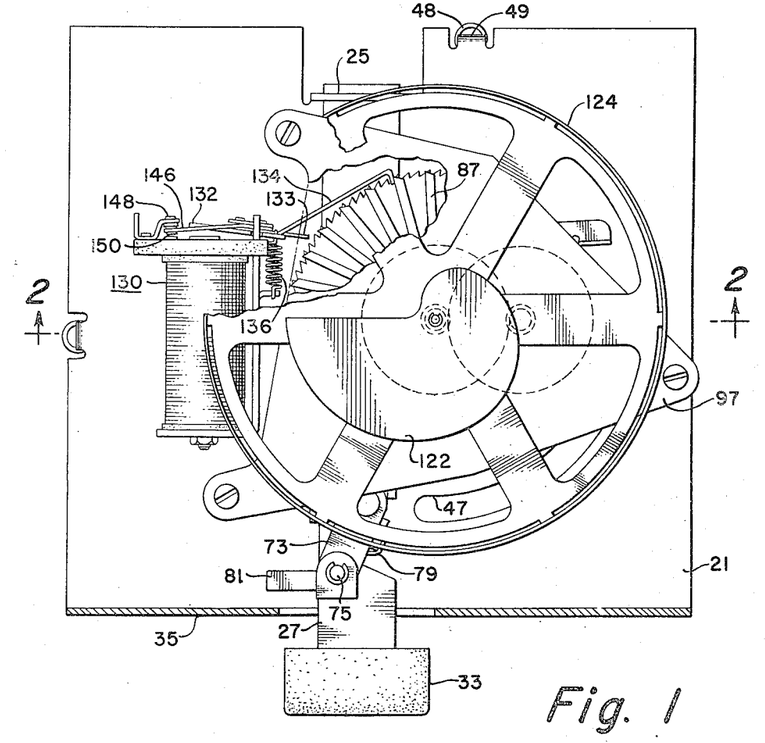
Fig. 1 is a top view of a mechanism embodying one form of our invention.
Figure 2:
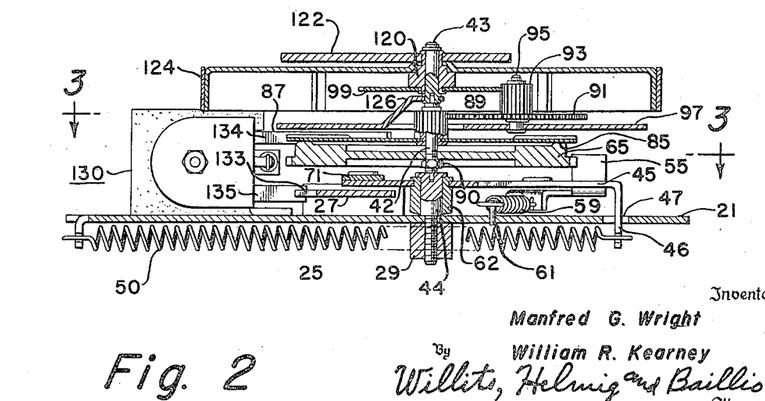
Fig. 2 is a sectional view taken substantially along the line 2—2 of Fig. 1.

At the center of the bed plate 21 is a cylindrical member 29 (see Fig. 2). Supported above the bed plate 21 is a triangular supporting plate 97 having a supporting arm 126 which suports a stud 43. Rotatably mounted upon a hub 62 is the spring operated member 45. This spring operated member 45 has a downwardly turned projection 46 extending through a 90 degree arcuate slot 47 in the bed plate 21 as shown in Figs. 2 and 3. A tension power spring 48 has its one end connected to the projection 46. From this projection 46, this spring 48 extends at an angle of about 60 degrees and at its opposite end connects to an anchor projection 49 provided upon the upper edge of the bed plate as shown in Fig. 3. This spring 48 normally holds the spring operated member 45 against a stop formed by the turned up projection 67 extending up from the bed plate 21, as shown in Fig. 3.

This one spring 48 provided sufficient power to operate the mechanism. However, it has been found when the device is used to operate the tuning mechanism of a stop-on-signal type of radio apparatus that the initial acceleration and starting speed is too great to allow the operator to remove his finger in time to stop the mechanism when a signal is received closely adjacent the starting point. Therefore to overcome this difficulty and to provide a slow smooth initial acceleration we provide a longer and less powerful compensating spring 50 having one end likewise connected to the projection 46 and extending horizontally therefrom to an anchoring projection 51 provided upon the left side of the bed plate as shown in Fig. 3. This compensating spring exerts a strong counteracting force when the power spring 48 is stretched to the position shown in Fig. 4. These springs 48 and 50 make an angle of between about 65 and 80 degrees to each other throughout the movement of the spring operated member 45. If other spring lengths and sizes of wire and coils are used, this angle may vary more than this.

Figure 4:
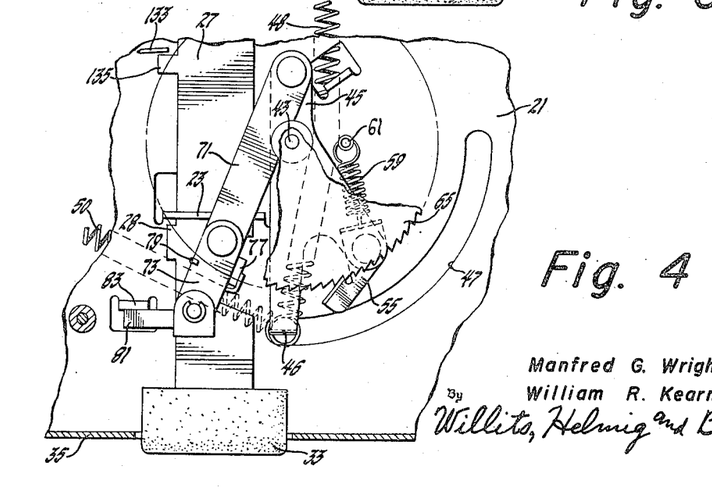
Fig. 4 is a fragmentary sectional view taken along a portion of the line 3—3 but showing the push mechanism forced inwardly but with the toggle link assembly still in its normal position.

The spring operated member 45 is provided with an arm 53 to which is pivoted a pawl 55. The inner end of the pawl 55 is provided with a spring anchorage 57 which makes an angle of about 130 degrees with respect to the tooth of the pawl. The spring anchorage 57 on the pawl 55 is connected by a tension coil spring 59 to a stationary spring anchorage 61 staked to bed plate 21, substantially on a line between the stud 43 and the upper end of the slot 47 in the bed plate 21 as shown in Figs. 3 and 4. The hub 62 is adjustably held in place by the flange of the cylindrical member 44 which is fastened to the bed plate by the tightening of the cylindrical member 29 on the threaded extension of the member 44. The position of the spring anchorage 61, the length of the spring 59 and the position of the spring anchorage 57 with respect to the tooth of the pawl 55 insures that the tooth of the pawl 55 will disengage itself from the ratchet wheel 65 when the spring operated member 45 engages the stop projection 67 as shown in Fig. 3. It also insures that the pawl 55 will engage the ratchet wheel 65 when the projection 46 is in the extreme clockwise portion of the slot 47 as shown in Fig. 4. The driving force of the pawl 55 upon the ratchet wheel 65 insures the continuing engagement of the tooth of the pawl 55 with the ratchet wheel 65 through about 90 degrees of rotation before being disengaged when the spring operated member 45 engages the stop projection 67 as shown in Fig. 3.

The spring operated member 45 is provided with an operating arm 69 to the end of which is pivotally connected a link 71. The lower or front end of this link 71 is pivotally connected to a secondary link 73 in turn connected by the pivot 75 to the slide member 27. To hold the links 71 and 73 in position to enable them to operate the spring operated member 45 from the position shown in Fig. 3 to the position shown in Fig. 4 when the push button 33 is pushed inwardly, the slide member 27 is provided with a turned up stop projection 77 against which the link 73 will rest during this movement. The link 73 is provided with a torsional spring 79 which is wrapped around the pivot 75 and has one end hooked around the stop 77 and the other end around the link 73 for holding this link 73 against the stop 77. This causes the links 71 and 73 to remain in the form of a column until they are forced out of this position.

The pushing in of the push button 33 and the slide member 27 causes the spring operated member 45 and its arm 69 to turn about the hub 62 from the position shown in Fig. 3 to the position shown in Fig. 4. During all this time the links 71 and 73 remain in the form of a column so that a positive push is provided from the slide member 27 to the arm 69. When the projection 46 substantially reaches the lower end of the slot 47 as shown in Fig. 4, the links 71 and 73 are substantially in alignment due to the movement of the pivot point upon the end of the arm 69 from the position shown in Fig. 3 to the position shown in Fig. 4.

Figure 5:
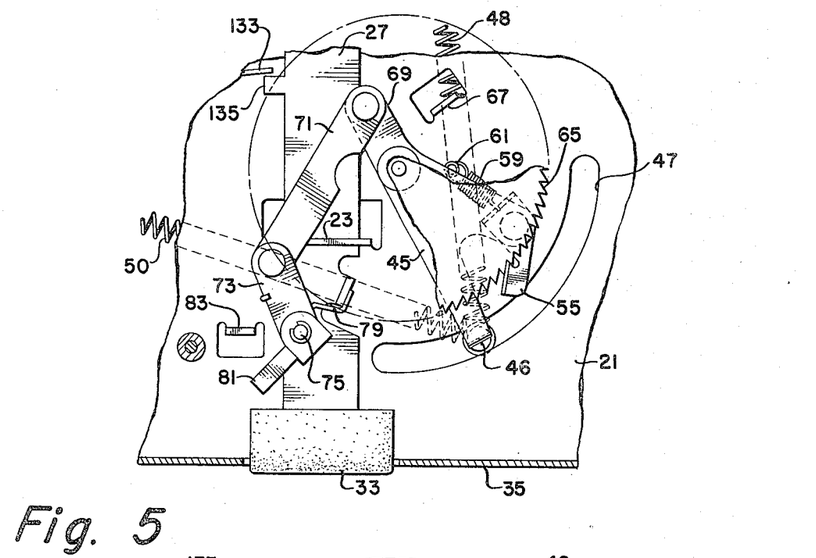
Fig. 5 is a view similar to Fig. 4 but showing the parts in a position slightly later in the timed sequence of operation.
Figure 6:
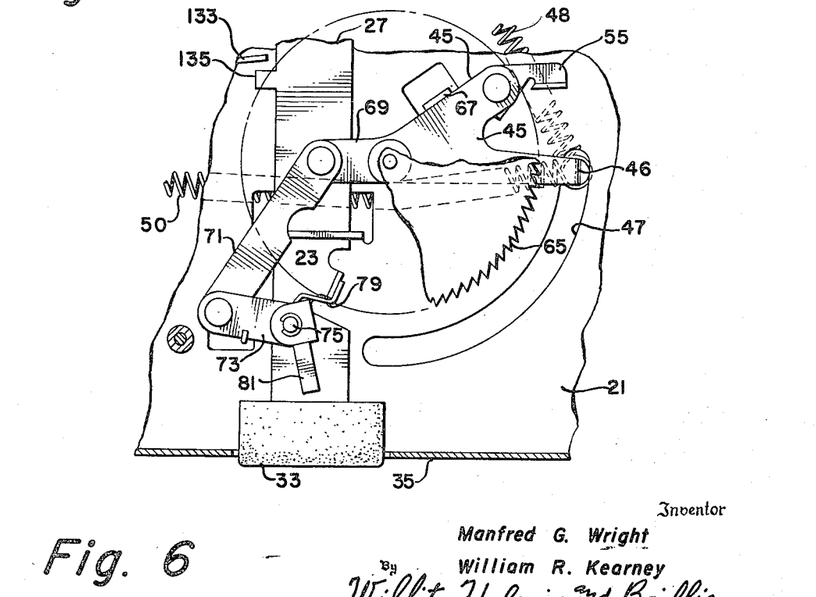
Fig. 6 is a view similar to Figs. 4 and 5 but showing the parts substantially at the end of the timed sequence of operation.

To release the spring operated power member 45, the link 73 is provided with an arm 81 which projects laterally from the slide member 27 so that it is carried by the slide member 27 into engagement with a suitable stop projection 83 which is turned up from the bed plate 21 in the path of movement of the arm 81. A slight additional inward movement of the push button 33 and the slide member 27 brings the links 71 and 73 across the dead center alignment of the toggle links 71 and 73 and causes them to deflect to the left and collapse as shown in Figs. 5 and 6. The slide member 27 is provided with a stop propection 28 which allows this additional inward movement before it engages the slotted projection 23.

As shown in Fig. 4 the angularity of the pawl spring 59 insures the initial engagement of the tooth of the pawl 55 with the ratchet wheel 65. The power spring 48 is against the side of the cylindrical member or center post 29 and therefore has only a very small effective torque arm applicable to turning the spring operated member 45 upon the cylindrical member 29. At this time however the compensating spring 50 is at its shortest length and therefore exerts very little tension but is also at its greatest moment arm so that its retarding force is nearly equal to the driving force of the spring 48 providing a slight net torque applied to the operated member 45 in the counter-clockwise direction as shown in Fig. 4. At this time the springs 48 and 50 make an angle of about 78 degrees to each other. This insures a slow starting of the spring operated member 45 when the toggle links 71 and 73 collapse.

As the spring operated member 45 moves, for example, through the position shown in Fig. 5, the torque applied by the power spring 48 gradually increases because the moment arm increases faster than the spring force decreases and at the same time the torque of the compensating spring is decreasing because the moment arm decreases faster than the force increases, the net result being a rapidly increasing driving force. The low starting torque causes a slow start which enables the operator to release the button before the tuner has travelled more than 20 kilocycles, then the rapidly increasing driving force quickly brings the mechanism up to a tuning speed which will allow the band to be scanned in approximately 5 seconds. As the rotational movement of the spring operated member 45 continues the acceleration and rise in rotational speed continue thereby imparting rotation to the flywheel which is incorporated as a part of the ratchet wheel 65.

As shown particularly in Fig. 2, the ratchet wheel 65 has a heavy rim for storing energy to make it effective as a flywheel. The rim of the flywheel portion of the ratchet wheel 65 is provided with an up-turned rounded annular projection 85. Upon this projection 85 in light frictional engagement therewith are the fingers of a stop wheel 87. The pressure upon the hub of the stop wheel 87 provides frictional engagement between the fingers of the stop wheel 87 and the annular projection 85 for driving purposes. The stop wheel 87 is riveted to a pinion 89 rotatably mounted upon the flanged bearing 44. A nut 90 is provided upon the bearing 44 to draw the hub of the stop wheel 87 closer to the flywheel 65 to increase the friction between the fingers of the stop wheel 87 and the flywheel 65.

This pinion 89 drives a reduction gear train including a large gear 91 which is directly connected to a second pinion 93. The gear 91 and the pinion 93 are rotatably mounted upon a stud 95, the lower end of which is fastened to the triangular supporting plate 97. The pinion 93 meshes with a gear 99 riveted to a bearing bushing 120 which carries the tuning cam 122 and the indicating drum 124 which preferably has applied to it a scale of the various radio frequencies in kilocycles through which the tuning cam 122 operates the tuning mechanism of the stop-on-signal type of radio apparatus. The bearing bushing 120 is rotatably mounted upon the stud 43. Supported above the bed plate 21 is the triangular plate 97 provided with a supporting arm 126 for supporting the stud 43. The cam 122 is connected to the tuning means of the radio set in such a way that the tuning means traverses the radio frequency band while seeking a station and then after a quick return stroke the cycle is repeated. The scale of radio frequencies in kilocycles on the indicating drum 124 is oriented and coordinated with the cam 122 and the tuning means of the radio set to indicate the radio frequency to which the set is turned at any particular time.

To stop the tuning mechanism of the radio when a radio signal of sufficient strength is received there is provided a relay 130. This relay 130 includes an armature 132 having a stopping pawl 134 extending therefrom in a position to engage the fingers of the stop wheel 87. A small coil spring 136 is provided for normally keeping the pawl 134 in a position to engage the fingers of the stopping wheel 87 and to hold the armature 132 away from the core of the relay 130. The armature 132 is provided with an arm 133 extending into the path of movement of the projection 135 on the push button slide member 27. Near the end of the inward movement of the push button slide member 27, this projection 135 engages and moves the arm 133 to lift the pawl 134 out of engagement with and out of the path of the fingers of the stop wheel 87. This frees the flywheel 85 for rotation under the force of the springs 48 and 50 when the toggle links 71 and 73 are collapsed following the engagement of the arm 81 with the stop 83.

The armature 132 also carries a leaf spring 146 provided at its end with a pair of contacts adapted to make contact with either of the stationary contacts 148 and 150 when the armature 132 is moved downwardly. The movement of the arm 133 by the projection 135 when the push button 33 is pushed inwardly causes the contacts upon the leaf spring 146 to engage the contact 150.

The movement of the contacts upon the leaf spring 146 out of contact with the contact 148 into contact with the contact 150 changes the circuits in the radio set from a normal signal receiving arrangement to a signal seeking arrangement in which a trigger tube and the relay 130 are included. Upon release of the push button 33 the initial movement of the tuning means by the cam 122 in accordance with the rotation of the flywheel 65 detunes the signal being received by the radio set. This detuning of the signal causes a voltage change in the signal seeking circuit arrangement which energizes and holds the relay 130 in this position with the stopping pawl 134 lifted out of the path of the fingers of the stop wheel 87 until another signal is received. When a station signal is received, as illustrated in Patent 2,494,017, the relay 130 will be deenergized thereby immediately releasing its armature 132 to cause the pawl 134 to immediately engage the fingers of the stopping wheel 87 to stop the tuning mechanism at the instant the station is tuned in. At the same time the contacts of the leaf spring 146 are returned into contact with the contact 148 to return the radio set to a normal signal receiving arrangement. The combined flywheel and ratchet wheel 65 is not stopped immediately but continues to rotate upon its own inertia until frictional contact between fingers of the stop wheel 87 and the rounded angular projection 85 upon the combined flywheel and ratchet wheel 65 is sufficient to stop the rotation.

The device operates as follows: the push button 33 is pushed inwardly from the position shown in Fig. 3 thereby causing the slide member 27 to be moved inwardly under the guidance of the slots in the projections 23 and 25. The force provided by pushing upon the push button 33 is transmitted through the pin 75 and the links 73 and 71 to the arm 69 of the spring operated member 45. The spring force applied by the spring 79 to the link 73 as well as the force transmitted by the links 73 and 71 keeps the link 73 in contact with the projection 77 to prevent the collapsing of the links at this time. The movements of the slide member 27 and the links 71 and 73 as well as the rotation of the spring operated member 45 continue until the positions shown in Fig. 4 are reached.

A continued inward movement of the push button 33 from the position shown in Fig. 4 by the engagement with the projection 83 will cause the arm 81 and the link 73 to be turned counterclockwise beyond the position of alignment of the links 73 and 71 shown in Fig. 4 to cause the deflection and collapse of the links 71 and 73 to the left as shown in Fig. 5. This collapse of the links 71 and 73 frees the spring operated member 45 for rotation under the torque provided by the stretched power spring 48 and the control spring 50 as shown in Fig. 4. Because of the small effective moment arm through which is applied the force of the power spring 48 at the start of the rotation of the ratchet wheel 65, the starting speed of the ratchet wheel 65, the stopping wheel 87, the transmission gearing, the cam 122, and the drum 124 is comparatively slow. Therefore, if a station signal is quickly received, the thumb can be removed from the push button 33 quickly enough that the mechanism can be stopped on a station within 20 kilocycles of travel of the drum 124.

The speed of rotation of the spring operated member 45 gradually increases until the pawl 55 releases itself from the combined flywheel and ratchet wheel 65. This occurs as the arm 45 contacts the stop 67 in the position shown in Fig. 6. The receiving of the station signal by the radio apparatus may release the pawl 134 for engagement with the stopping wheel 87 at any time when the pawl 55 is in engagement with the combined flywheel and ratchet wheel 65 or at any time thereafter during the operation of the cam 122 which will continue to rotate because of the inertia put into the combined flywheel and ratchet wheel 65 by reason of their energy of rotation.

A radio controlled electric circuit is operated when a station signal is received to deenergize the relay 130 and release the pawl 134 for engagement with the stopping wheel 87. Such a circuit is disclosed in Patent No. 2,494,017, issued January 10, 1950 to Andrew G. Tynan.

In Figs. 7 to 10 there is shown another form of the invention. In this form there is provided a bed plate 221 provided at the front and rear ends with sets of guiding projections 223 and 225 for guiding the push button slide member 227. This slide member 227 is provided with a push button 233 at its front end.

Figure 7:
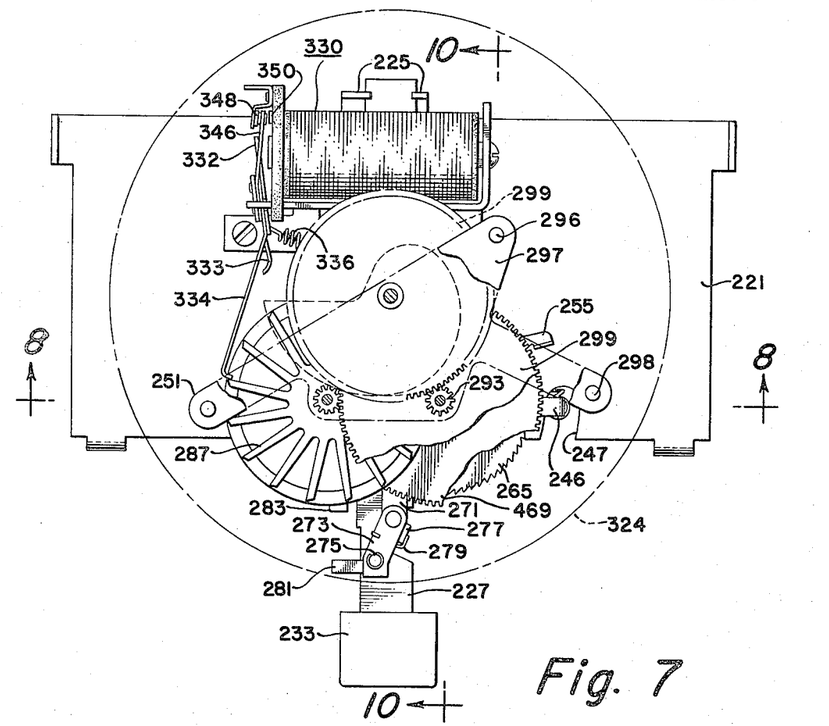
Fig. 7 is a top view with the dial wheel removed of a mechanism embodying a second form of our invention.
Figure 8:
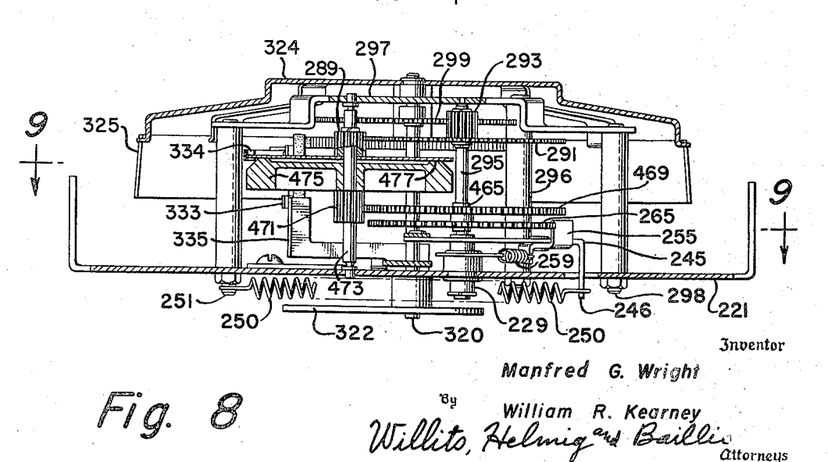
Fig. 8 is a sectional view taken substantially along the line 8—8 of Fig. 7.
Figure 9:
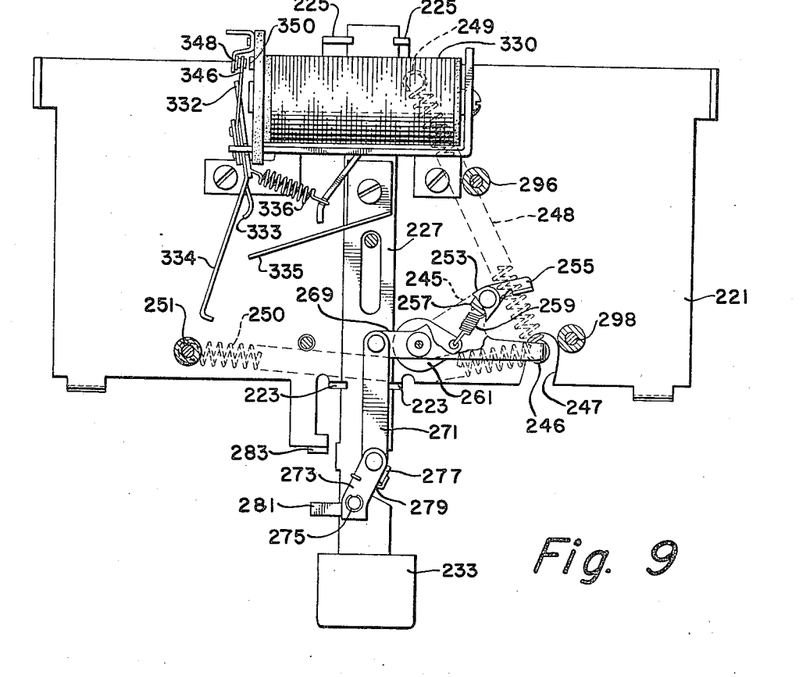
Fig. 9 is a sectional view taken substantially along the line 9—9 of Fig. 8.
Figure 10:
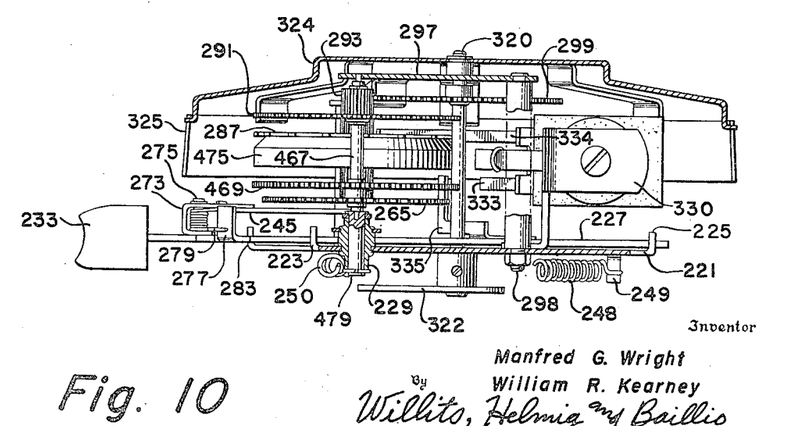
Fig. 10 is a sectional view taken substantially along the line 10—10 of Fig. 8.

Upon the bed plate 221 there is provided a fixed hub 229. Rotatably mounted upon this hub 229 by the pin 479 is a spring operated member 245. This spring operated member 245 has a downwardly turned projection 246 extending into a notch 247 in the bed plate 221 as shown in Figs. 7 and 9. A tension power spring 248 has one end connected to the projection 246. From this projection 246 the power spring 248 extends at an angle of about 60 degrees and at its opposite end connects with an anchor projection 249 extending downwardly from the bed plate 221 as shown in Fig. 10. This power spring 248 normally holds the spring operated member 245 in its extreme counterclockwise position.

This one spring 248 has sufficient power to operate the mechanism. However as in the first modification, when only a single spring is used to operate the tuning mechanism of a stop-on-signal type of radio apparatus, the initial acceleration and starting speed is too great to allow the operator to remove his finger from the push button 233 in time to stop the mechanism when a signal is received closely adjacent the starting point. Therefore, as in the first modification, there is provided a longer and less powerful compensating spring 250 having one end likewise connected to the projection 246 and the other end connected to the bottom of a mounting bolt 251 provided beneath the bed plate 221 as shown in Figs. 7 to 10. The compensating spring 250 exerts a strong counteracting force when the power spring is stretched substantially to its maximum amount in the same manner as in the first modification. These springs 248 and 250 make an angle of between about 65 and 80 degrees to each other throughout the movement of the spring operated member 245. If other springs lengths and sizes of wire and coils are used this angle may vary more than this.

This spring operated member 245 is provided with an arm 253 to which is pivoted a pawl 255. The inner end of the pawl 255 is provided with a spring anchorage 257 which makes an angle of about 130 degrees with respect to the tooth of the pawl. The spring anchorage 257 on the pawl 255 is connected by a tension coil spring 259 to a stationary spring anchorage 261 fixed to the hub 229. This stationary spring anchorage is located substantially on a line between the axis of the hub and the end of travel of the projection 246 as shown in Fig. 9. The position of the spring anchorage 261, the length of the spring 259, and the position of the spring anchorage 257 with respect to the tooth of the pawl 255, insures that the tooth of the pawl 255 will disengage itself from its ratchet wheel 265 when the spring operated member reaches the end of its travel as shown in Fig. 9. It also insures that the pawl 255 will engage the ratchet wheel 265 when the projection 246 is in its extreme clockwise position. The driving force of the pawl 255 upon the ratchet wheel 265 insures the continuing engagement of the tooth of the pawl 255 with the ratchet wheel 265 through about 90 degrees of rotation before being disengaged when it reaches the end of its travel as shown in Fig. 9.

The spring operated member 245 is provided with an operating arm 269 to the end of which is pivotally connected a link 271. The front end of the link 271 is pivotally connected to a secondary link 273 in turn connected by a pivot 275 to the slide member 227. To hold the links 271 and 273 in position to enable them to operate the spring operated member 245 from the position shown in Fig. 9 to its extreme clockwise position when the push button 233 is pushed inwardly, the slide member 227 is provided with a turned up stop projection 277 against which the link 273 rests during this movement. The link 273 is provided with a spring 279 wrapped around the pivot 275 and having one end hooked around the stop projection 277 and the other end to the link 273 for holding this link 273 against the stop projection 277. This causes the links 271 and 273 to remain in the form of a column until they are forced out of this position.

The pushing in of the push button 233 and the slide member 227 causes the spring operated member 245 and its arm 269 to turn about the hub 229 from the position shown in Fig. 4 about 90 degrees clockwise. During all this time the links 271 and 273 remain in the form of a column so that a positive push is provided from the slide member 227 to the arm 269. When the projection 246 on the spring operated member 245 reaches the end of its clockwise movement, the links 271 and 273 are substantially in alignment due to the movement of the pivotal connection upon the end of the arm 269.

To release the spring operated member 245, the link 273 is provided with an arm 281 which projects laterally from the slide member 227 into engagement with a suitable stop projection 283 extending from the bed plate 221. A slight inward movement of the push button 233 after the stop projection 283 is engaged, causes the arm 281 to pivot the link 273 so as to carry the toggle links 271 and 273 across the dead center position to the left. This causes the toggle links 271 and 273 to collapse and release the spring operated member 245 under the force provided by the power spring 248 as compensated by the compensating spring 250. The release and action of the springs 248 and 250 during the stroke of the spring operated member is the same as in the first embodiment and therefore the description thereof found in the first embodiment applies equally well to the second embodiment.

The ratchet wheel 265 is fixed to a hub 465 which is rotatably mounted upon a shaft 467. Directly above the ratchet wheel 265 and likewise fixed to the hub 465 is a large drive gear 469. This drive gear 469 is in a step up driving engagement with a pinion 271 fixed to a vertical shaft 473 to which is also fixed a small flywheel 475. The rim of the flywheel is provided with a rounded annular projection or bead 477. Upon this projection 477 in light frictional engagement therewith are the fingers of a stop wheel 287. There is sufficient pressure against the hub of the stop wheel 287 to provide an adequate frictional engagement with the annular projection 477 on the flywheel 475 for driving purposes. The stop wheel 287 is fixed to a pinion 289 rotatably mounted upon the shaft 473. The pinion 289 drives a reduction gear train including a large gear 291 which is directly connected to a second pinion 293. The gear 291 and the pinion 293 are rotatably mounted upon the shaft 295, the lower end of which is connected to a pin 479 located in the hub 229. The upper end of the shaft 467 is supported by the supporting plate 297. The supporting plate 297 is supported by spacers and mounting bolts 251, 296 and 298. The pinion 293 meshes with a gear 299 fixed to a vertical shaft 320 which at its lower end carries the tuning cam 322 and at its upper end carries the indicating drum 324 which preferably has applied to its rim 325 a scale of various radio frequencies in kilocycles through which the tuning cam 322 operates the tuning mechanism of the stop-on-signal type of radio apparatus. The cam 322 is connected to the tuning means of the radio set in such a way that the tuning means traverses the radio band in one direction while seeking a station and then, after a quick return stroke, the traverse is repeated. The scale of radio frequencies in kilocycles on the scale 325 is oriented with the cam 322 and the tuning means of a radio set to indicate the radio frequency to which the set is tuned at any particular time.

To stop the tuning mechanism of the radio when a radio signal of sufficient strength is received there is provided a relay 330. This relay includes an armature 332 having a stopping pawl 334 extending therefrom in a position to engage the fingers of the stop wheel 287. A small coil spring 336 is provided for normally keeping the pawl 334 in a position to engage the fingers of the stopping wheel 287 and to hold the armature 332 away from the core of the relay 330. The armature 332 is provided with an operating arm 333 extending into the path of movement of a long irregularly shaped arm 335 fixed to and extending from the push button slide member 227. The extreme end of this arm 335 engages and moves the arm 333 to move the pawl 334 out of engagement with and out of the path of the fingers of the stop wheel 287. This frees the flywheel 475 for rotation under the force of the springs 248 and 250 when the toggle links 271 and 273 are collapsed following the engagement of the arm 281 with the stop 283. As in the first embodiment, the armature 332 also carries the leaf spring contact member 346 adapted to make contact with either of the stationary contacts 348 and 350. The movement of the arm 333 by the projection 335 when the push button 233 is pushed inwardly causes the contacts upon the leaf spring 346 to move out of contact with the contact 348 and into contact with the contact 350. This changes the circuits in the radio set from a normal signal receiving circuit arrangement to a signal seeking circuit arrangement in which a trigger tube and the relay 130 are included. Upon release of the push button 233, the initial movement of the tuning means by the cam 322 in accordance with the rotation of the flywheel 475 detunes the signal being received by the radio set. This detuning of the signal causes a voltage change in the signal seeking circuit arrangement which energizes and holds the relay 330 in this position with the stopping pawl 334 lifted out of the path of the fingers of the stop wheel 287 until another signal is received. When a station signal is received as illustrated in Patent No. 2,494,017, the relay 330 will be deenergized immediately thereby releasing the armature 332 to cause the pawl 334 to immediately engage the fingers of the stop wheel 287 to stop the tuning mechanism at the instant the station is tuned in. At the same time, the contacts of the leaf spring 346 are returned into contact with the contact 348 to return the radio set to a normal signal receiving arrangement. The flywheel 475 and the ratchet wheel 265 and their connecting gearing are not stopped immediately but continue to rotate upon the inertia of the flywheel 475. The frictional contact between the fingers of the stop wheel 287 and the rounded annular projection 477 upon the flywheel 475 is sufficient to gradually stop their rotation.

This second form operates in a manner similar to the first form. The push button 233 is pushed inwardly from the position shown in Fig. 7 thereby causing the slide member 227 to be moved inwardly under the guidance of the projections 223 and 225. The force provided by pushing upon the push button 233 is transmitted through the pin 275 in the links 273 and 271 to the arm 269 of the spring operated member 245. The spring force applied by the spring 279 to the link 273 as well as the force transmitted by the links 273 and 271 keeps the link 273 in contact with the projection 277 to prevent the collapsing of the links at this time. The movements of the slide member 227 and the links 271 and 273 continue throughout a movement of the spring operated member 245 in a clockwise direction of about 90 degrees. This clockwise movement of the spring operated member 245 is terminated by the engagement of the arm 281 with the projection 283. This engagement causes the link 273 thereby to be turned counterclockwise beyond the position of alignment of the links 273 and 271 to cause the deflection and collapse of the links 271 and 273 to the left.

This collapse of the links 271 and 273 frees the spring operating member 245 for rotation under the force provided by the spring 248 and the compensating or control spring 250. Because of the small effective moment arm through which is applied the force of the pawl spring 248 at the start of the rotation of the ratchet wheel 265, the starting speed of the ratchet wheel 265, the flywheel 475, the stopping wheel 287, the transmission train, the cam 322 and the drum 324 is comparatively slow. Therefore, if a station signal is quickly received the thumb can be removed from the push button 233 quickly enough that the mechanism can be stopped within 20 kilocycles of travel of the drum 324. The speed of rotation of the spring operated member 245 gradually increases until the pawl 255 releases itself from the ratchet wheel 265. This occurs as the spring operated member 245 reaches the end of the travel as shown in Fig. 9.

The receiving of a station signal by the radio apparatus may release the pawl 334 for engagement with the stopping wheel 287 at any time when the pawl 355 is in engagement with the ratchet wheel 264 or at any time thereafter during the operation of the cam 322 which will continue to rotate because of the inertia put into the flywheel 475 by reason of its speed of rotation. The flywheel 475 provides improved performance and a greater amount of inertia because of its higher speed of rotation. This is provided by reason of the step up gear transmission extending from the ratchet wheel 265 to the flywheel 475. As is evident from the relative size of the drive gear 469 and the driven pinion 471 the flywheel 475 will operate about eight times the speed of the ratchet wheel 265. A radio controlled electric circuit is operated whenever a station signal is received to deenergize the relay 330 and release the pawl 334 for engagement with the stopping wheel 287. Such a radio circuit is disclosed in Patent No. 2,494,017 issued January, 10, 1950, to Andrew G. Tynan.

While the form of embodiment of the invention as herein disclosed constitutes a preferred form it is to be understood that other forms might be adopted, as may come within the scope of the claims which follow.

What is claimed is as follows:

1. A mechanism including a wheel having an axis of rotation, means rotatably mounted upon said axis of rotation provided with a device for engaging said wheel, a plurality of spring means connected to said means and extending from their points of connection at an angle of between 60° and 80° to each other, and means for moving said rotatably mounted means to put energy into said spring means for driving said wheel.

2. A mechanism including a wheel having an axis of rotation, means rotatably mounted upon said axis of rotation provided with a device for engaging said wheel, a plurality of spring means conected to said means and extending from their points of connection at an angle of between 60° and 80° to each other, and means for moving said rotatably mounted means to put energy into said spring means for driving said wheel, and means for releasing said rotatably mounted means when said spring means have received a substantial amount of energy.

3. A mechanism including a rotating means, a flywheel, a multiplying drive means from the rotating means to the flywheel, a stop wheel, a friction drive connecting the flywheel with the stop wheel, a reduction drive transmitting means connected to said stop wheel, a stopping device cooperating with said stop wheel for stopping the stop wheel and the transmitting means, means for energizing said rotating means, and means for releasing said stopping device during the energization of said rotating means.

4. A mechanism including a wheel having an axis of rotation, means rotatably mounted upon said axis of rotation provided with a device for engaging said wheel, a flywheel, a multiplying drive means from said wheel to the flywheel, a power spring connected to said rotatably mounted means for rotating said wheel, a compensating spring connected to said rotatably mounted means in an opposing relationship to said power spring, and means for moving said rotatably mounted means to put energy into said spring means for rotating said wheel and flywheel.

5. A mechanism including a kinetic energy storage means, a spring driving means operatively connected to said storage means with an increasing moment arm arrangement with increasing movement, and a compensating spring means connected to oppose said driving means with a decreasing moment arm arrangement with increasing movement.

6. A mechanism including a kinetic energy storage means, a rotatably mounted means rotatable from a starting position to a stopping position for driving said storage means, a spring driving means connected to said rotatably mounted means and to an anchorage in a line which is substantially in alignment with the center of rotation when the rotatably mounted means is in its starting position, and a compensating spring means connected to said rotatably mounted means and to an anchorage in a line which is substantially tangent to the circular path of the connection in the starting position.

7. A mechanism including a kinetic energy storage means, a rotatably mounted means rotatable from a starting position to a stopping position for driving said storage means, a spring driving means connected to said rotatably mounted means and to an anchorage in a line which is substantially in alignment with the center of rotation when the rotatably mounted means is in its starting position, a hub around which the spring means will roll to keep the spring means from attaining a zero moment arm, and a compensating spring means connected to said rotatably mounted means and to an anchorage which is substantially tangent to the circular path of the connection in the starting position.

8. A mechanism including a rotating means, a flywheel, a multiple drive means from the rotating means to the flywheel, a stop wheel, a friction drive connecting the flywheel with the stop wheel, a stopping device cooperating with said stop wheel for stopping the stop wheel, means for energizing said rotating means, and means for releasing said stopping device during the energization of said rotating means.

9. A mechanism including a driving means, spring means for operating said driving means in one direction, a movable operating means, a first link pivotally connected to said operating means, a second link pivotally connected to said driving means, a pivotal connection between said first and second links, a one way stop and spring arrangement cooperating with at least one of the links for resiliently holding the links substantially in alignment when the operating means is operated to move the driving means to put energy into said spring means, and means responsive to a predetermined tensioning of said spring means for buckling said two links to release said spring means to operate the driving means.

10. A mechanism including a member pivoted on an axis, a first spring means having one end connected to said member, a normally stationary anchorage for the other end of said spring means located on the opposite side of the pivot from the connection of said first spring means when said member is substantially in a first limit of movement, a second spring means having one end connected to said member, a second normally stationary anchorage for the other end of said second spring means located on the opposite side of the pivot from the connection of said second spring means when said member is substantially in a second limit of movement, one of said spring means having greater force than the other for moving said member from the second limit to the first limit, and operating means for moving said member in the opposite direction of movement from said first limit to said second limit of movement.

11. A mechanism including a pivoted member, spring means for rotating said member in one direction, a slidably mounted operating means, a first link pivotally mounted upon said operating means, a second link pivotally connected to said pivoted member, means for locking said links to operatively connect said operating means to impart energy to said storage means, and a normally stationary stop means located in the path of movement of a portion of said first link for moving said links to unlocking position for releasing said pivoted member for operation upon the energy imparted to the spring means by the operating means.

References Cited in the file of this patent
UNITED STATES PATENTS

| | | |
|---|---|---|
| 1,100,697 | Osterlind | June 16, 1914 |
| 1,542,341 | Deckert | June 16, 1925 |
| 2,330,430 | Kantor et al. | Sept. 23, 1943 |
| 2,515,498 | De Craene et al. | June 18, 1950 |
| 2,574,137 | Zenner | Nov. 6, 1951 |